United States Patent
Sobolev

(10) Patent No.: US 10,218,959 B2
(45) Date of Patent: Feb. 26, 2019

(54) METHOD FOR TRANSMITTING AND RECEIVING STEREO INFORMATION ABOUT A VIEWED SPACE

(71) Applicant: LIMITED LIABILITY COMPANY "3D TV TECHNICS", Moscow (RU)

(72) Inventor: Sergey Aleksandrovich Sobolev, Moscow (RU)

(73) Assignee: LIMITED LIABILITY COMPANY "3D TV TECHNICS", Moscow (RU)

( * ) Notice: Subject to any disclaimer, the term of this patent is extended or adjusted under 35 U.S.C. 154(b) by 286 days.

(21) Appl. No.: 14/902,922

(22) PCT Filed: Jun. 30, 2014

(86) PCT No.: PCT/RU2014/000472
§ 371 (c)(1),
(2) Date: Jan. 5, 2016

(87) PCT Pub. No.: WO2015/005826
PCT Pub. Date: Jan. 15, 2015

(65) Prior Publication Data
US 2016/0191892 A1    Jun. 30, 2016

(30) Foreign Application Priority Data
Jul. 9, 2013 (RU) .............................. 2013131263

(51) Int. Cl.
*H04N 13/167* (2018.01)
*H04N 13/194* (2018.01)
(Continued)

(52) U.S. Cl.
CPC ......... *H04N 13/167* (2018.05); *H04N 13/194* (2018.05); *H04N 13/243* (2018.05); *H04N 13/351* (2018.05); *H04N 2013/0081* (2013.01)

(58) Field of Classification Search
CPC ........... H04N 13/0051; H04N 13/0242; H04N 13/0447; H04N 13/0059; H04N 2013/0081
See application file for complete search history.

(56) References Cited

U.S. PATENT DOCUMENTS 5,063,441 A * 11/1991 Lipton ................ H04N 5/2259
348/360
2005/0053274 A1   3/2005 Mayer et al.
(Continued)

FOREIGN PATENT DOCUMENTS

EP    2061261 A1    5/2009
RU    2065133 C1    8/1996
(Continued)

OTHER PUBLICATIONS

Polyakov, Alexey, "Digital 3D-TV, Variants of construction of volumetric imaging system", Jun. 2010, pp. 14-18.
(Continued)

*Primary Examiner* — Christopher S Kelley
*Assistant Examiner* — Nasim N Nirjhar
(74) *Attorney, Agent, or Firm* — BCF LLP

(57) ABSTRACT

The invention relates to stereoscopic television. Technical result of it is an increase in accuracy with which the transmission of stereoscopic video images is controlled as a result of the automatic real-time measurement of the physical space being photographed. In the present method, stereo photography is carried out by a symmetrically centered multi-angle stereo system with synchronized video cameras, video signals in adjacent lines are recorded and compared, angle signals adjacent to the central signal are detected in said lines, the temporal parallaxes of said signals are measured in a single temporal framework, the parallax signals are synchronized with the video signal of the central video camera, a signal stream is transmitted to the receiving end
(Continued)

and recorded, the video signals of the stereoscopic angle shots are reproduced by shifting elements of the signals of the central camera to adjacent temporal parallaxes, and the image is represented.

1 Claim, 1 Drawing Sheet

(51) Int. Cl.
*H04N 13/351* (2018.01)
*H04N 13/00* (2018.01)
*H04N 13/243* (2018.01)

(56) References Cited

U.S. PATENT DOCUMENTS

| 2010/0321388 | A1* | 12/2010 | Daly | H04N 13/021 345/427 |
| 2012/0062756 | A1* | 3/2012 | Tian | H04N 19/008 348/218.1 |

FOREIGN PATENT DOCUMENTS

| RU | 2192104 | C2 | 10/2002 |
| RU | 2202860 | C2 | 4/2003 |
| RU | 2322771 | C2 | 4/2008 |
| RU | 2421933 | C2 | 6/2011 |
| RU | 2456654 | C2 | 7/2012 |
| RU | 2474973 | C2 | 2/2013 |
| RU | 2490819 | C1 | 8/2013 |
| WO | 2011029209 | A2 | 3/2011 |
| WO | 2012070010 | A1 | 5/2012 |

OTHER PUBLICATIONS

"Stereoscopic Image", Encyclopedia of Physics and Technology, http://www.femto.com.ua/articles/part_2/3889.html.
Book (in Russian): Vedenov, Alexander Alekseevich, "Matematics of Stereoscopic Images", Moscow: Knowledge, 1991, p. 48: (News in life, science, technology; 11, Mathematics , Cybernetics); ISBN 5-07-002199-0.
English Abstract of RU2065133C1.
English Abstract of RU2192104C2.
English Abstract of RU2202860C2.
English Abstract of RU2322771C2.
English Abstract of RU2421933C2.
English Abstract of RU2456654C2.
English Abstract of RU2474973C2.
English Abstract of RU2490819C1.

* cited by examiner

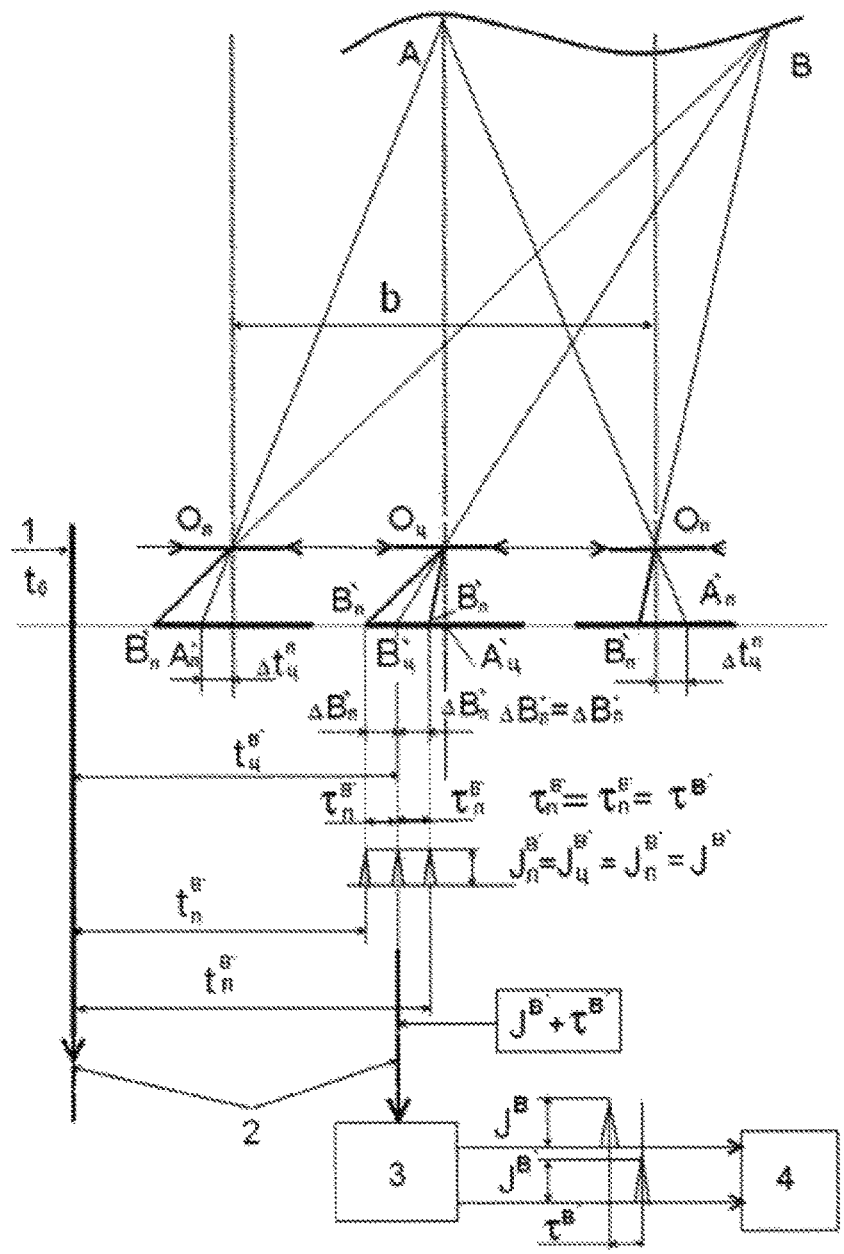

METHOD FOR TRANSMITTING AND RECEIVING STEREO INFORMATION ABOUT A VIEWED SPACE

The present invention is directed to the television engineering, namely, to stereoscopic television (3D TV) and may be use as a technical vision in precise dynamic control systems for mobile objects, for wide use in broadcasting 3D TV and the Web, as well as in different branches of culture, science and technology where information about spatial dimensions of the viewed object space and objects present in it is required.

Stroboscopic methods are known that are used for ranging by measuring linear parallaxes of adjacent points on their images in stereo pair frames based on the functional dependence:

$$L = f(F; b; \Delta 1), \text{ where} \quad (1)$$

L is the range to the viewed point;
F is the focal distance of stereo system lenses;
b is the stereo system base;
$\Delta 1$ is a linear parallax between adjacent images of the viewed point in stereo pair frames.

For an analogue, a "Method for automated measurement of external medium coordinates for composing its 3D model in 3D TV system of technical vision" [1]. This method is designed for the use in a human-machine complex comprising a technical vision system consisting of a TV stereo block connected to PC, a display for image visualization, and a cursor steering device. The measured point of the viewed scene is marked on the display by the cursor, and its three spatial coordinates are calculated automatically using a PC software and visualization on the display. The disadvantages of this method are as follows: video flow doubling for transmitting stereo pair frames, measurement of coordinates of static objective points of the scene, the necessity of operator interference into selection and measurement of a set of the object points for calculation of its geometrical model.

For a prototype, a method using the so-called 2D+Z format is used, "Digital 3D TV", Tele-Sputik, June 2010 [2]. Engineering implementation of the 3D broadcasting is carried out by correlating any common (2D) image and the information about camera-to-each pixel distance (Z-coordinate). Such presentation of an image is called the "2D+Z format", and the Z coordinate plane is called the "depth manuscript". This allows stereoscopic video transmitting with the data flow increase just by 25-30%. The manuscript is presented as a monochrome image where camera-to-objective points distances are denoted by grey gradations. In this case, for the manuscript calculation an algorithm for analyzing differences between two channels of video recording is used. Video flows of the composite resolution channel and monochrome depth manuscript Z image synchronized with the latter are transmitted by two image circuits to the receiving side.

For 3D image reconstruction, a series of frames shall be calculated. Stereoscopic image is recovered by interpolation of the initial image with regard to the depth manuscript. The series of frames obtained simulates a 3D-video and is then demonstrated on any stereo display.

The main disadvantages of this method include the necessity of applying complicated algorithms that require analysis of the frame images and high computing intensity that increases inertness of the system. Such a method is, generally, applicable for receiving and visual representation of only subjective stereoscopic images. In such a technology, the real-time automatic measurement of the objective space is virtually unreal. Application of this method to navigation and vehicle control systems, including remote and automated control during operation in various media and in real time is rather problematic.

In order to determine the objective space image, its measurement shall be accompanied by calculation of all or a majority of objective point images in the stereo pair frames. In the known methods of object reconstruction by stereo pair images, each measured point is determined by the operator that takes much time and may only be applied to static images, e.g. in mapping, when stereo images taken by aerial photography are processed on a stereo compactor.

For automation of this process, many algorithms have been proposed [3, 4]. However, this problem is extremely difficult and, apparently, is far not addressed: analysis of a stereo pair suggests the presence of rather broad knowledge about the world in the computer memory, in the absence of which decoding of the stereo pair is unlikely, in general. [5]

The present method is aimed at creation of a TV stereo system based on the existing TV technology, in the invariant frame of reference independent of the objective space, its real-time automatic measurement with minimum necessary and sufficient data volume transmitted by an image circuit to be used in precise control systems and for playing 3D images in extended comfortable viewing zone. The present method is based on the dependence (1), where all values are constant, except for the linear parallax value which may be presented in the following form:

$$L{-}K\Delta 1$$

where K is the instrument transfer function of a particular stereo system.

K for the system is measured on a metrological bench according to a 3D calibrated scene and is a constant value accounting for all features of the current design of transmitting stereo TV video camera.

Measuring the linear parallax in units compatible with the metrics used in the system remains the main task for displaying and measuring the 3D viewed objective space.

The target goal is achieved by the reason that for implementation of the present invention the stereo TV pick-up is carried out by a synchronized multi-angle stereo TV system with symmetrically centered spatial structure of video cameras location which axes of lenses are parallel to one another and are located in the same plane, by formation of a depth manuscript according to measurements of immediate temporal parallaxes between signals from each point images in the objective space and signals conjugated with it from their images in aspect horizontal signals, horizontal scan speed in a comparative structure of horizontal, quickly remembered video signals from simultaneously viewed line of the objective space and composed in the integrated temporal frame of reference with the origin set by a line synchronization signal of the stereo system, conjugated signals being identified by similarity of their disposition in the comparative structure of horizontal video signals to the spatial structure of video cameras location and equality of the conjugated signals level in angle video cameras with the signal in the central one, with further transmission of full resolution video signals into the image circuit and transmission of the depth manuscript signals synchronized with it via a receiver to a computing block that provides reconstruction of horizontal angle video signals by shifting signals from the central video camera by corresponding temporal parallaxes for composing stereo frames and multi-angle stereo representation of 3D images, and by frame-by-frame analysis—the composition of a 3D digital image of the objective space with calculation of coordinates and dynamic characteristics of comprised objects necessary for informative support of the control systems.

FIG. 1 Legend:
1. Line synchronization signal defining the common reference for measurements of temporal distances and time intervals—the parallaxes;
2. Signals transmitted via the image circuit;
3. Computing block;
4. Stereo display;

A and B are objective points in different target zones; b is a general stereo camera base;

Ол; Оц; Оп are central points of stereo camera lenses;

А'л; А'ц; А'п; В'л; В'ц; В'п are images of objective points on video mitrices;

$\Delta_{B'л}, \Delta_{B'п}$ are linear parallaxes symmetric about В'ц point;

$\tau_0$ is the common reference point for temporal distances and intervals set by the line synchronization signal;

$t_л^{B'}, t_ц^{B'}, t_п^{B'}$ are temporal distances from the line synchronization signal to signals from objective point B images in the left, central and right video cameras measured by the horizontal scan speed;

$\tau_л^{B'}, \tau_п^{B'}$ are temporal parallaxes for the objective point B image measured by the horizontal scan speed;

$J_л^{B'} = J_ц^{B'} = J_п^{B'}$ are levels of signals from B' images of the objective point B in the left, central and right video cameras.

LEGEND for FIGURES—Translation of certain Russian texts used in the FIGURES:

| Рис. 1 | FIG. 1 |
|---|---|
| ц (центральный) | c (central) |
| л (левый) | l (left) |
| п (правый) | r (right) |

The TV method of transmitting two-dimensional images of the viewed objective space in 2D format is widely used for both broadcasting and industrial purposes. Transmission of three-dimensional images in 3D format appears to be rather unconventional and has no acceptable technical solution for wide application yet. Stereoscopic movie and photography pick-ups are known well, however, methods used for these purposes are poorly acceptable by TV transmission of dynamic images in real time. The principle of three-dimensional perception of the viewed objective space by a man or an animal with binocular vision concludes in simultaneous comparative analysis of two-dimensional images in both eyes carried out in the brain. The complexity is that images of each point in the viewed objective space obtained at different angles differ from one another in their spatial location in the images representing frames of the same stereo pair. These images of the objective points in the stereo pair frames are called conjugated, and their spatial difference is called the parallax. The parallax value characterizes the range to this point and allows to assess or even measure it. However, since ranges to different points of the viewed space are arbitrary and vary continuously at any movements of objects located in the space, parallaxes do continuously change by value and position in images, too. In humans and animals this problem of perceiving the surrounding objective space by their minds is solved by the brain in conjugation with the binocular vision apparatus.

The goal of the present invention is automatic identification of conjugated points, their spatial position in TV frames of the stereo pair and measurement of parallaxes in the general space-time framework and the metrics. Formation of a stereo TV flow of video signals by adding synchronized parallax ranging signal to transmitted chrominance video signal. The use of the information flow appeared on the receiving side in control systems and for reconstruction of the second frame of the stereo pair by the parallax signal for the purpose of stereo representation.

For implementation of the method, first, a spatial symmetrical structure of a stereo system is formed. For this purpose, axes of lenses of symmetrically located central (full resolution) and side (angle) video cameras are aligned in the same plane and parallel to one another. Cameras control is timed by the common scanning stage. This provides simultaneous reading by video cameras of the same line in the objective space and conjugation of all lines in the solid time frame created by the common scanning stage. Hereafter, for the purpose of detecting in simultaneously read lines conjugated with the central signal among side (angle) signals, the line video signals are promptly recorded and compared by their line synchronization signals. In the comparative line structure obtained, side (angle) video signals will be located symmetrically about the central signal due to symmetrically centered spatial arrangement of the video cameras, the linear intervals being equal:

$$\Delta B'л = \Delta B'п, \qquad (2)$$

the latter being the spatial topological sign of conjugation for identification of signals. Making a working assumption that signals from the represented objective point in all video cameras are equal, we get:

$$J_л^{B'} = J_ц^{B'} = J_п^{B'} \qquad (3)$$

According to these distinctive signs (2, 3), the computing unit identifies a combination of symmetrically arranged and equal side (angle) signals conjugated with the central (leading) signal, and measures the temporal parallax between them by the horizontal scan speed $$\tau_л^{B'} = \tau_п^{B'} = \tau^{B'} \qquad (4)$$

The values of temporal parallaxes obtained for all video signals of the central (leading) full resolution video camera of 2D format and representing line ranging signals in the format of temporal parallaxes, are transmitted into the image circuit in 2D+Z format timely with the composite video signal.

On the receiving side, from the information received a 3D digital image of the objective space and coordinates and dynamic characteristics of objects composing it are calculated using the functional ranging dependence on the relative location of video cameras, current values of focal distances of video camera lenses and temporal scanning characteristics to be used in navigation and control systems.

For reconstruction of stereo pair frames and their multi-angle 3D visual representation on an elemental stereo display, video signals of composite resolution in each line are shifted in space by a linear value defined by the self speed of horizontal scan and corresponding value of temporal parallax. Presentation of the ranging signals in the format of temporal parallaxes provides miscibility with all receivers possessing the same type of scanning with the self speeds conjugated with the self linear dimensions of screens.

In addition, when the elemental representation method is used, a slight increase in the number of side video cameras may provide a significant increase in the zone of comfortable viewing of 3D images.

REFERENCES

1. RU 2065133 C 1. Method for automated measurement of external medium coordinates for composing its 3D model in 3D TV system of technical vision.
2. Digital 3D TV (Alternatives for composing a 3D visualization system). 76/announce/14.html.
3. Physics and Technology Encyclopaedia. "Stereoscopic image", http://www.articles/part_2/3889.html.
4. RU 2192104 C2, 27.10.2002«A method for obtaining stereoscopic TV images».
5. Mathematics of stereo images. A. A. Vedenov, M., 1991.

The invention claimed is:

1. A method for obtaining, transmitting, receiving and displaying stereo information, the method executable in a system, the system having:
   a central video camera;
   two side video cameras,
       the two side video cameras being symmetrically positioned with respect to the central video camera,
       optical axes of the two side video cameras and the central video camera being parallel to each other and being aligned in one plane,
       the two side video cameras and the central video camera, each having a photo sensitive video matrix, being synchronized by a line synchronization signal for simultaneous scanning of the viewed space;
   a computing unit operatively coupled to the central video camera and the two side cameras;
       the method comprising:
           capturing, by the central video camera, a central 2D video of a viewed space;
           simultaneously with the capturing of the central 2D video, reading, by the two side video cameras and the central video camera, from each photo sensitive matrix, signals of images of a line of the viewed space,
               the reading being performed with a horizontal scan speed, to obtain two side line signals and a central line signal for analysis and for detection of conjugated signals;
           detecting the conjugated signals by comparing, by the computing unit, the two side line signals and the central line signal, the conjugated signals being detected as being located symmetrically in the two side line signals and being at equal intervals from a central signal, and levels of the conjugated signals being equal to a level of the central signal;
           measuring, by the computing unit, with the horizontal scan speed, the equal intervals and determining immediate temporal parallaxes between the central signal and each of the conjugated signals;
           generating, by the computing unit, an output video of the central video camera having the central 2D video synchronized with the immediate temporal parallaxes; and
           shifting of every point in each line of the central 2D video by a linear value to reconstruct and display stereo frames on a stereo display, the linear value being determined by a receiver's speed of horizontal scan and the immediate temporal parallaxes.

* * * * *